United States Patent

[11] 3,593,647

[72] Inventor Walter C. Copeland, Jr.
 Madison, Fla. 32340
[21] Appl. No. 788,369
[22] Filed Jan. 2, 1969
[45] Patented July 20, 1971

[54] BROILER
 5 Claims, 8 Drawing Figs.
[52] U.S. Cl. .................................................. 99/259,
 99/339, 99/446, 99/447, 126/41
[51] Int. Cl. .............................................. A47j 37/06
[50] Field of Search .................................... 99/400,
 259, 375, 408, 419, 425, 443, 444, 447, 446;
 126/9, 11, 14, 25, 29, 39, 41, 51—52, 85

[56] References Cited
UNITED STATES PATENTS

| 463,073 | 11/1891 | Noakes et al. | 99/400 X |
| 594,394 | 11/1897 | Gibbons | 99/400 X |
| 1,134,343 | 4/1915 | Mago | 99/400 UX |
| 2,031,330 | 2/1936 | Padelford et al. | 99/400 X |
| 2,894,448 | 7/1959 | Henderson et al. | 99/259 X |
| 3,046,969 | 7/1962 | Davis | 126/9 |
| 3,474,725 | 10/1969 | McClaren | 99/447 X |

FOREIGN PATENTS

| 747,241 | 3/1933 | France | 99/44 |

Primary Examiner—Walter A. Scheel
Assistant Examiner—Arthur O. Henderson
Attorneys—George H. Baldwin and Arthur G. Yeager ABSTRACT: A portable gas-fired cooker for broiling meat and the like includes a hollow generally upright cylindrical member having a closed bottom and an open top, a grill for cooking the meat positioned across the open top, gas burner means generally centered within the hollow cylindrical member and positioned spacedly downwardly from the open top, and an inverted conical plate extending across the cylindrical member and positioned between the gas burner means and the grill. The plate has an imperforate center portion and a perforated outer portion to permit flames to extend upward through the perforated outer portion to cook the meat by direct flame heat. Additionally, the plate is adapted and arranged to catch and collect drippings and juices emitted from the cooking meat permitting the burner means to burn the collected drippings and juices on the plate whereby smoke therefrom rises upward to engulf the cooking meat and impart a savory charcoal flavor to the same.

INVENTOR.
Walter C. Copeland, Jr.
BY
George H. Baldwin
ATTORNEY

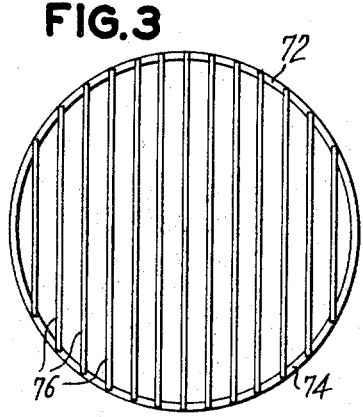
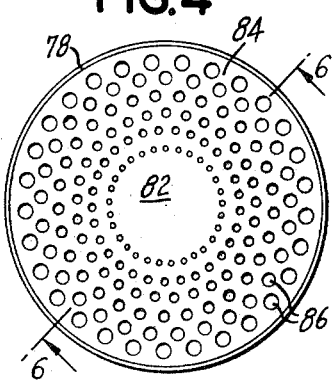
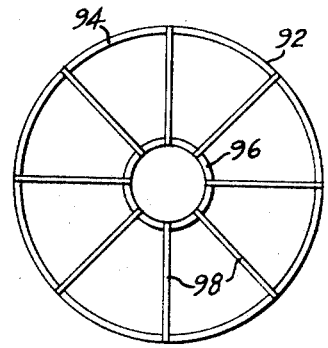
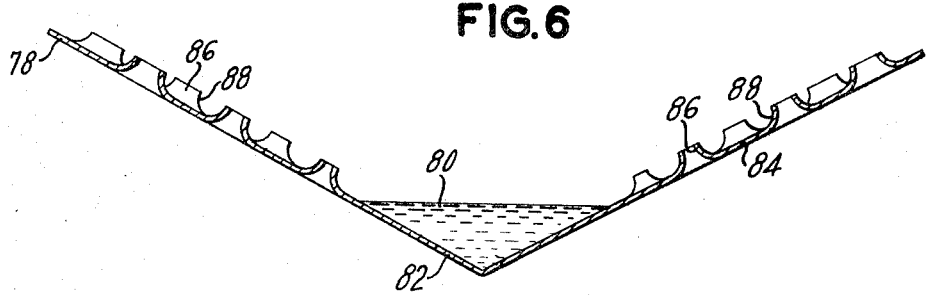
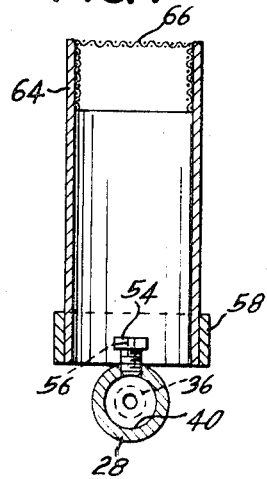
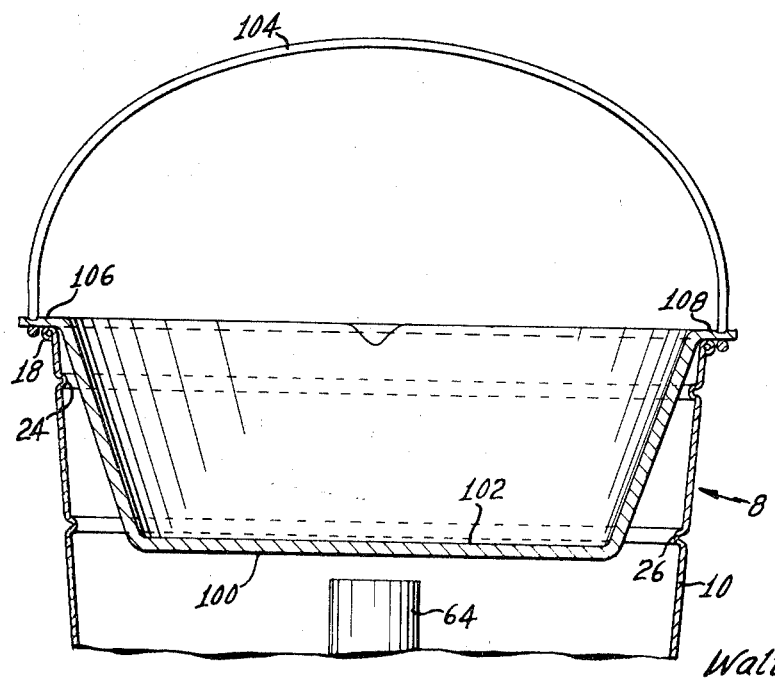

BROILER

BACKGROUND OF THE INVENTION

1. Field of the Invention

This invention relates to an improved and useful grill or broiler of the portable type normally used out-of-doors for preparing food for picnics and the like, which is fueled by bottled compressed gas. More particularly, the instant invention pertains to an improved gas-fired cooker for broiling meats and the like wherein a savory charcoal flavor is imparted to the meat. The cooking of the foods with the broiler of the present invention is affected by both radiant heat and by certain amounts of direct contact with the flame.

Conventional grills or outdoor cookers operating with bottled gas are often constructed so that the burners are positioned above or to the side of the meat or other food being cooked. In the conventional gas-fired grill it is not generally possible to position the gas burners directly below the food, since the juices and fats liberated by the cooking meat will run into the burner interfering with its operation and in most cases clogging the burner orifices extinguishing the flame.

Some gas operated outdoor cooking devices or grills are constructed with the source of heat positioned below the food being cooked. In such cases however, the flame does not directly heat the food and cook the same but heats a continuous pan or similar contiguous plate interposed between the burner and the food. Such devices therefore act in the manner of an ordinary frying pan.

In charcoal grills the meat is placed directly over the hot coals. The grease and other juices liberated from the meat by the heat drip down on the coals and burn back on the meat in the form of a yellow flame. This yellow flame directly sears the surface of the meat and deposits some unburnt carbon particles thereon. It is thus more or less literally, at least partially cooked by its own juices and fats. This searing and burning back gives charcoal cooked meat its distinctive appearance and flavor which is generally preferred. In this connection it is to be noted that it is not the charcoal per se which gives the charcoal flavor, but the fact that the meat or other food is cooked directly above the hot or at least glowing source of heat allowing the searing and burning back.

The cooking on charcoal fires however, is a relatively combersome and time-consuming procedure, involving the necessity of starting a charcoal fire and waiting until the same reaches the necessary temperature at which the coals glow red. Furthermore, the use of charcoal as a fuel for this purpose is relatively expensive, since a large quantity of charcoal is generally ignited and burned for use over a very short cooking period, generally involving the cooking of not more than several pieces of meat. The majority of the heat generated by the combustion is therefore not used for the cooking process, but used in bringing the bed up to the cooking temperature and then allowing the coals to burn out after the cooking operation has been completed.

In the past it has not been generally possible to duplicate the charcoal effect when cooking with gas burners and it was never deemed possible to construct a grill or outdoor cooker which would operate with the burner directly below the food being cooked due to the problem of juices and greases.

2. Description of the Prior Art

Portable grills and outdoor cookers for broiling meats and the like have been previously devised, such prior art devices being generally disclosed in U.S. Pat. Nos. 3,067,811 and 2,722,883. Applicant's invention, of an improved portable gas-fired cooker for broiling meats wherein a savory charcoal flavor is imparted to the meat, disclosed herein is an improvement over such prior art grills and cookers, as shown for example in the above-mentioned mentioned patents.

SUMMARY OF THE INVENTION

Therefore it is the general object of this invention to provide a cooking device of the outdoor type which is easy to fire not only in the beginning of the cooking process but during and throughout the cooking process.

Another object of the invention is to provide a portable grill which completely eliminates and does away with the worry of ashes during and throughout the entire cooking process.

Still another object of the subject invention is to provide a portable gas-fired cooker constructed in such a manner that drippings falling from the meat being broiled thereon will not fall directly into the fire but will be caught and collected in an area between the meat and the open flame such that these drippings will be ignited and burned in this area. The smoke and gases arising from the burned drippings in this area will be brought into contact with all parts of the meat being broiled and will cause a distinctive and desirable charcoal flavor to be imparted thereto.

Yet another object of the instant invention is to provide a portable grill or outdoor broiler operated by bottled gas and employing a gas burner over which foods such as meats, fish, fowl, etc. may be directly cooked which will impart to the cooked food the same savory charcoal grilled flavor and appearance as if the same had been cooked over an open charcoal fire.

A further object of this invention is to provide a gas-fired portable cooker employing a gas burner which will cook very economically and very rapidly, utilizing in addition to the heat supplied by the burning of the fuel at least a portion of the heat supplied by the burning of the fats and greases of the food being cooked.

Still a further object of the invention is to provide a gas operated broiler which is easily and economically produced, which is sturdy in construction, which is highly efficient in operation, and which employs a gas burner which may be used with a portable gas supply as an economic, efficient, and convenient substitute for a conventional outdoor charcoal grill.

In general these and other objects are obtained by providing a portable gas-fired cooker for broiling meat and the like including a hollow generally upright member having an open top, a grill for cooking the meat positioned across the open top, gas burner means generally centered within said hollow member and positioned spacedly downwardly from the open top, and an inverted generally conical plate extending across the upright member and positioned between the gas burner means and the grill. The plate has an imperforate center portion and a perforated outer portion such that flames may extend upward through the perforated outer portion to cook the meat by direct flame heat. Additionally the plate is adapted and arranged to catch and collect drippings and juices emitted from the meat being cooked such that the burner means may burn the collected drippings and juices on the plate to cause smoke therefrom to engulf the cooking meat whereby a savory charcoal flavor is imparted to the meat.

BRIEF DESCRIPTION OF THE DRAWINGS

The novel features which are believed to be characteristic of this invention are set forth with particularity in the appended claims. The invention itself, however, both as to its organization and method of operation, may best be understood by reference to the following description taken in connection with the accompanying drawings, in which:

FIG. 3 is a top plan view of the broiling grill of the apparatus of this invention;

FIG. 4 is a top plan view of the conical-shaped drippings catch plate of the apparatus of this invention;

FIG. 5 is a top plan view of the cooking grate of the apparatus of this invention;

FIG. 6 is an enlarged cross-sectional view taken along line 6—6 of FIG. 4;

FIG. 7 is an enlarged transverse sectional view taken along line 7—7 of FIG. 1; and FIG. 8 is a partial elevational view, portions thereof being in cross section, showing a second use of the gas-fired grill of this invention.

DETAILED DESCRIPTION OF THE PREFERRED EMBODIMENT

Figure 1:
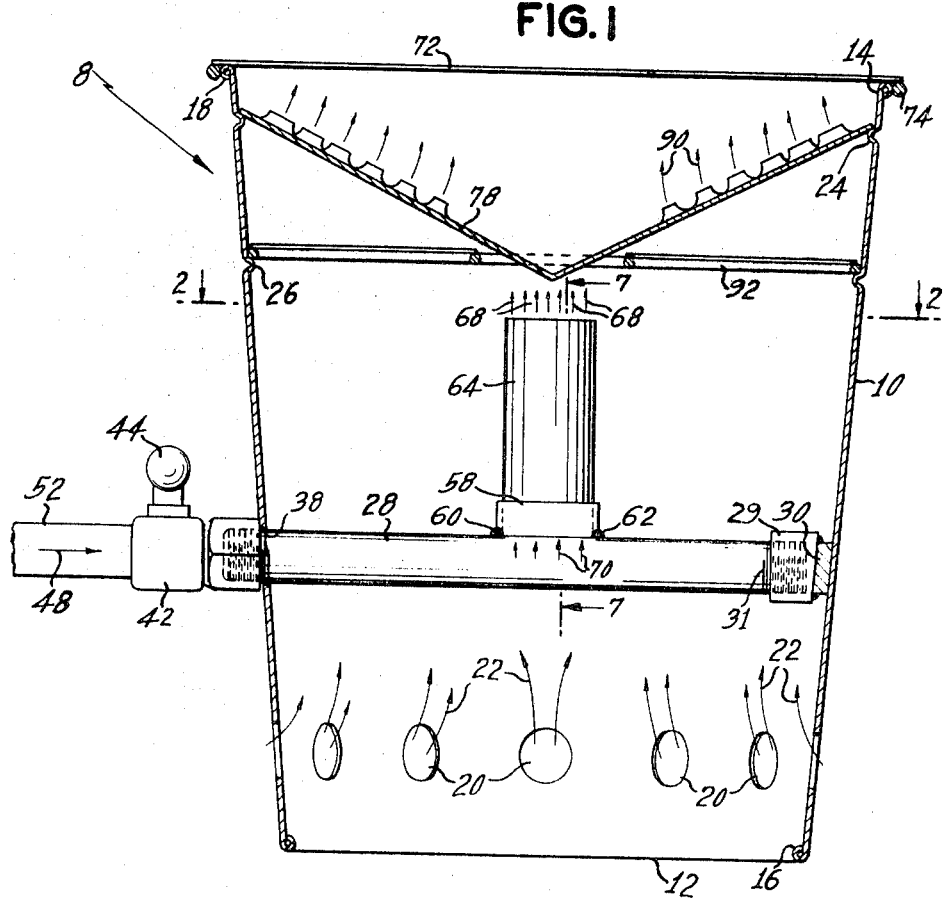
FIG. 1 is a front elevational view of the improved charcoal flavor, gas-fired grill of this invention, portions thereof being shown in cross section.
Figure 2:
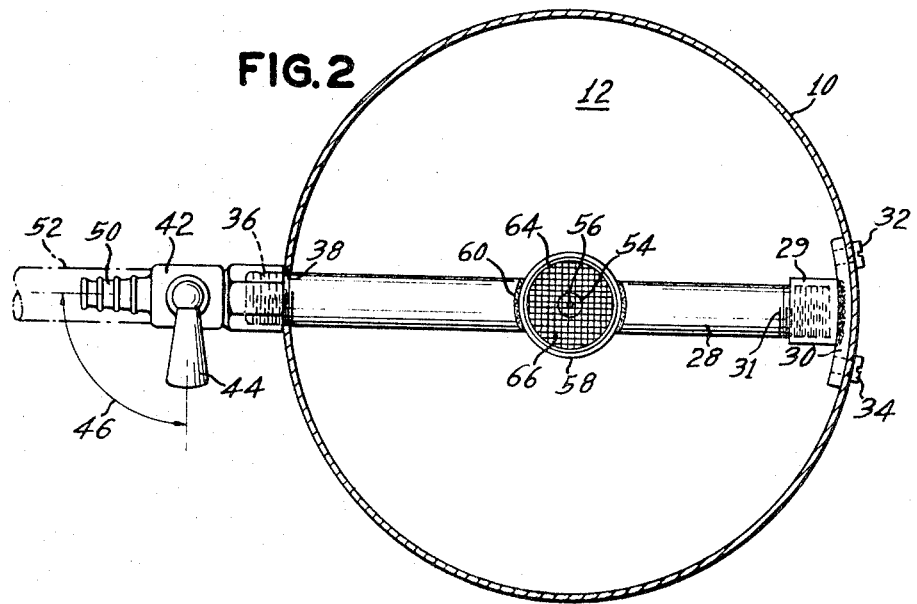
FIG. 2 is a cross-sectional view taken along line 2—2 of FIG. 1.

With detailed reference to the drawings, and in particular to FIGS. 1 and 2 thereof, the improved gas-fired grill 8 of this invention, wherein a charcoal flavor is obtained with the use thereof, is seen to include a generally upright and cylindrical member of container 10 having a bottom 12 and an open top 14. Member 10 is similar to or can be the well-known bucket, can, container or other like vessel, and includes an inwardly turned internal bead 16 adjacent its bottom 12 and an outwardly turned external bead 18 adjacent its open top 14. The bottom may be closed by the surface on which the member 10 rests when in use, or it may be closed by a panel as in a common metal bucket or pail. In either event, the bottom will be closed, whether by resting on such surface or by such panel, when the cooker is in use. Member 10 is provided with a series of holes or openings 20 equally spaced thereabout and positioned upwardly from bottom 12. Openings 20 permit air to enter into container or member 10 and move upwardly within the same in the direction of arrows 22, to aid in the combustion and burning taking place in the upper portion thereof. Circular container or member 10 further includes an internal ring or rib 24 positioned closely adjacent its opening top 14 and a second internal ring or rib 26 positioned downwardly of the first internal rib 24, the purpose and function of internal rings or ribs 24 and 26 will be explained more fully hereinbelow.

Improved gas-fired grill 8 includes a gas manifold 28 which generally extends diametrically across circular container 10 and generally adjacent its midportion. One end of gas manifold 28 is sealed by a threaded cap 29 secured on threaded portion 31 of manifold 28. Cap 29 is connected to a mounting bracket 30 which is mounted to the wall of member 10 by means of a pair of metal screws 32 and 34, and the other end of gas manifold 28 terminates in a threaded portion or nipple 36 which extends through an opening 38 within the side of container 10. Gas manifold 28 has a generally circular cross section, see in particular FIG. 7, and may be described as generally hollow or as having an elongated opening 40 extending therethrough such that gas may freely pass throughout the length thereof. Attached to nipple end 36 of gas manifold 28 is a gas petcock or valve 42 having a control handle 44 pivotable in the directions of double-headed arrow 46 from a closed position in which the supply of gas is shut off to an open position in which the gas from the supply freely flows into gas manifold 28 in the direction of arrow 48. Gas valve 42 is provided with a tapered nipple 50 for ready attachment of a hose 52 from the source of supply of the compressed bottled liquified petroleum gas (LPG). At the midportion of gas manifold 28 a screwlike member 54 (see FIG. 7) is provided which is mounted through the upper surface of the manifold and which has an opening or passageway 56 extending therethrough to provide a nozzle orifice for the gas supply within gas manifold 28 to enter the gas burner tube.

Attached to the midportion of the upper surface of gas manifold 28 is a ring member 58 which is connected thereto by means of welds 60 and 62. Engagingly supported within ring member 58 is an elongated gas burner tube 64 in which the pressurized gas mixes with air to form a combustible mixture. A fine screen 66 is provided across the open upper end of the combustion or gas tube 64 to further mix and diffuse the gases into a combustible mixture. It is above this screen 66 and in the area of arrow head 68 that the actual combustion and burning takes place. The pressurized gas issuing from orifice 56 draws air upward into the gas burner tube 64 in the direction of arrows 70, drawing the same through the lower open end of gas burner tube 64 from the area between gas manifold 28 and the sides of gas burner tube 64, see in particular FIG. 7.

With reference to FIG. 3, the gas fired grill 8 of this invention includes a broiling grill, grate or support 72 shown therein. Grill or support 72 is intended to be used with the apparatus when broiling such things as meats, fish, fowl, and particularly beef steak, when it is desired to obtain that savory charcoal flavor. Broiling grill or support 72 includes an outer generally circular rod or member 74 having a generally circular cross section to which is attached a plurality of equally spaced generally parallel steel rods 76 of generally circular cross section. Rods 76 are connected to member 74 by means of welds at the ends thereof or by other appropriate means. Broiling grill or support 72 when in use with the apparatus is generally positioned across the upper open end 14 of cylindrical member 10 with the circular steel rod or member 74 thereof being positioned outwardly of and in contact with the outwardly extending external bead 18 of member 10 to generally fix the positioning of grill 72 and generally attach the same to cylindrical member 10, see in particular FIG. 1.

With particular reference to FIGS. 4 and 6, the grilling apparatus further includes a generally conical-shaped plate 78 which acts as a catch or collector for the juices and drippings 80 from the meat being broiled on grill 72 thereabove; see FIG. 1 for the arrangement of plate 78 within the apparatus. Conical plate 78 includes an imperforate center collecting cup portion 82 wherein the drippings and juices 80 from the meat being broiled may collect until they are burned by means of the flame from burner tube 64 therebelow, and a perforated outer or peripheral portion 84 inclined downwardly toward the central collecting cup portion 82. The outer inclined plate portion 84 has circular rows of spaced openings or perforations 86 extending radially outward therein. Openings 86 are small near center portion 82 and increase in size with each row of openings toward the periphery of plate 78. Perforations 86 are punched upward from the bottom side of plate 78 to provide an integral upstanding juice-deflecting collar or flange 88 about each of openings 86 to prevent drippings falling on plate 78 from going through openings 86 whereby bottom 12 of member 10 is maintained in a clean state or condition. Conical plate 78 is positioned and rests upon rib 24 of cylindrical member 10, as seen in FIG. 1, when the apparatus is used for broiling meats and the like on broiler grill 72. When conical plate 78 is used in broiling, the flames of the combustion which takes place at and above the top of burner tube 64 heat the underside of plate 78, and at times extend upward through openings 86 therein as depicted by arrows 90 in FIG. 1. In this manner the drippings 80 which come in contact and which may collect on plate 78 are "burned-back" on to the meat cooking thereabove on grill 72 whereby the savory charcoal flavor is obtained. Also in this manner the whole of conical plate 78 cleans itself and the bottom 12 of member 10 remains clean such that the entire grilling apparatus 8 is a self-cleaning cooker. The meat on grill 72 is cooked by radiant heat from conical plate 78 and by some direct flame heat 90 extending upward through openings or perforations 86 within conical member 78. The burning of the drippings on plate 78 and the smoke therefrom as the meat is cooking on grill 72 gives the meat that distinctive "charcoal" flavor.

With particular reference to FIG. 5, the apparatus further includes a cooking grate 92 shown therein. Cooking grate 92 includes an outer circular member or steel rod 94 having a generally circular cross section and an inner circular steel rod or member 96 having a generally circular cross section with radially extending steel rods or members 98 extending between the inner 96 and outer 94 circular members. Cooking grate 92 is positioned within generally upright cylindrical member 10 adjacently above the top of gas burner tube 64, being positioned and resting on rib 26 of member 10 with the apex of conical plate 78 extending downward through the opening provided within the inner circular steel rod 96 of cooking grate 92, see FIG. 1. Cooking grate 92 may be used to support a small coffee pot, other type pot or the like thereon, when conical plate 78 and broiling grill 72 have been removed from the apparatus to heat or cook the contents of said pot with the same resting on cooking grate 92 adjacently above gas burner tube 64.

A further use of the improved gas-fired grill of this invention is depicted in FIG. 8 wherein a cast iron pot 100 or the like is shown in use therewith. The bottom portion 102 of pot 100 extends downward within generally upright cylindrical member 10 to be positioned adjacently above the upper end of gas burner tube 64 whereby the flame issuing therefrom can readily heat bottom portion 102 of pot 100 and the contents therein. This type of cast iron pot often includes a bail or handle 104 and a pair of ears 106 and 108 attached to the upper portion of the pot for attachment of bail or handle 104 to pot 100. In this use of the apparatus ears 106 and 108 of pot 100 are positioned and rest on outwardly extending external bead 18 to support and maintain the major portions of pot 100 extending within the upper portion of generally upright cylindrical member 10. When pot 100 rests on its bail ears 106 and 108 as depicted in FIG. 8, there is still adequate room or opening between the upper edge of pot 100 and the upper edge or bead 18 of cylindrical member 10 such that heat, steam, smoke and the like can pass out of the grill.

While only a certain preferred embodiment of this invention has been shown and described by way of illustration, many modifications within the true spirit and scope of this invention and within the following claims will occur to those skilled in the art.

What I claim as new and what I desire to secure by Letters Patent of the United States is:

1. In a cooker for broiling meat, a meat supporting grill, a juice collector underlying said grill, said collector including inclined plate means and collecting cup means integral with said plate means toward which said plate means incline downwardly, a source of heat disposed below said cup means and aligned to direct heat upwardly onto said cup and plate means said plate means having a plurality of perforations therethrough, and a respective juice-deflecting flange extending upwardly from said plate means at each said perforation for deflecting juices flowing downwardly on said plate means from flowing through the respective perforations.

2. The combination in accord with claim 1, wherein said deflecting flanges comprise portions of said plate means which are folded upwardly out of the perforations therein.

3. The combination in accord with claim 1 wherein each said flange comprises a collar upstanding completely around the respective perforation.

4. The combination in accord with claim 1 wherein said heat source comprises a gas burner providing a flame directed at the underside of said cup portion.

5. The combination in accord with claim 4 and an upstanding open top container supportedly surrounding said collector, said container comprising means for supporting said grill across the open top thereof and for supporting said gas burner below said cup means.